(12) United States Patent
Taki

(10) Patent No.: US 8,422,404 B2
(45) Date of Patent: Apr. 16, 2013

(54) METHOD AND DEVICE FOR TRANSMITTING PACKETS

(75) Inventor: Nobuhiro Taki, Kasugai (JP)

(73) Assignee: Fujitsu Semiconductor Limited, Yokohama (JP)

( * ) Notice: Subject to any disclaimer, the term of this patent is extended or adjusted under 35 U.S.C. 154(b) by 193 days.

(21) Appl. No.: 12/385,002

(22) Filed: Mar. 27, 2009

(65) Prior Publication Data

US 2009/0290599 A1 Nov. 26, 2009

(30) Foreign Application Priority Data

May 23, 2008 (JP) ................................. 2008-135809

(51) Int. Cl.
*H04L 12/28* (2006.01)
(52) U.S. Cl.
USPC ............................ 370/257; 370/389; 370/473
(58) Field of Classification Search ........................ None
See application file for complete search history.

(56) References Cited

U.S. PATENT DOCUMENTS

| | | | | |
|---|---|---|---|---|
| 6,118,763 A | * | 9/2000 | Trumbull ...................... | 370/231 |
| 6,614,808 B1 | * | 9/2003 | Gopalakrishna .............. | 370/469 |
| 6,889,257 B1 | * | 5/2005 | Patel ............................ | 709/232 |
| 2003/0066082 A1 | * | 4/2003 | Kliger et al. .................... | 725/80 |

FOREIGN PATENT DOCUMENTS

| | | |
|---|---|---|
| JP | 2001-94575 | 4/2001 |
| JP | 2003-229857 | 8/2003 |

OTHER PUBLICATIONS

Office Action issued Sep. 11, 2012 in corresponding Japanese Patent Application No. 2008-135809 (2 pages).

* cited by examiner

*Primary Examiner* — Chirag Shah
*Assistant Examiner* — Jenkey Van
(74) *Attorney, Agent, or Firm* — Staas & Halsey LLP

(57) ABSTRACT

A method for transmitting a packet including a packet data fragment and packet information with a transmission device, the method includes determining a concatenated quantity of packets based on size of the packet data fragment, generating a concatenated packet including packet data fragments corresponding to a plurality of first packets, wherein a number of the packet data fragments is determined based on the concatenated quantity, and packet information corresponding to the first packets, and transmitting the concatenated packet in any one of a plurality of communication cycles.

12 Claims, 7 Drawing Sheets

METHOD AND DEVICE FOR TRANSMITTING PACKETS

CROSS-REFERENCE TO RELATED APPLICATIONS

This application is based upon and claims the benefit of priority from the prior Japanese Patent Application No. 2008-135809, filed on May 23, 2008, the entire contents of which are incorporated herein by reference.

FIELD

The embodiments discussed herein relate to a method and device for transmitting packets.

BACKGROUND

A reproduction device, which reproduces digital video and audio data stored in media such as a CD, DVD, or hard disk (HD), is usually coupled to output devices, such as a monitor and/or a speaker, so that digital video and audio contents can be enjoyed. For example, there is a system that couples a plurality of input devices (i.e., reproduction devices) to a single output device and switches the output data. A system that couples a plurality of input devices and a plurality of output devices and switches the input data and output data has also been proposed to increase system versatility. In such a system, data transmission is in compliance with the IEEE 1394 standard, which is an international standard used for serial data communication systems.

IEEE 1394 enables high-speed data communication at 400 Mbps. For continuous moving image and audio reproduction, IEEE 1394 specifies an isochronous transfer mode, in which data transmission is performed in a given cycle (for example, 125 μs, hereinafter referred to as isochronous (ISO) cycle), and an asynchronous transfer mode, in which data transmission is performed asynchronously. The isochronous transfer mode is suitable for the transfer and reproduction of data such as digital video and audio data.

For example, in the system illustrated in FIG. 1, a transmission device 100 is coupled to a CD reproduction device 101, a microphone 102, and a DVD reproduction device 103, each of which serves as an input device. The transmission device 100 is coupled to different reception devices (not shown), each corresponding to the CD reproduction device 101, the microphone 102, and the DVD reproduction device 103, by a bus cable.

The transmission device 100 stores information (transfer destination information) for each input device to output the data input from each of the input devices 101 to 103. A path for transferring the data from the input device to an output device (coupled by a reception device) is referred to as a channel. That is, three channels are formed in the system shown in FIG. 1.

The transmission device 100 stores the data input from each of the devices 101 to 103 to an input unit 104 in a first-in first-out (FIFO) memory 105. The transmission device 100 generates packets including given amounts of data with a packet generator 107 in accordance with the data size stored in a register 106.

Referring to FIG. 2, a transmission channel controller 108 receives a cycle start packet for the isochronous transfer mode (operation 121) and sequentially enables the three channels (operation 122). In accordance with the quantity of the channels that is enabled, a channel selector 109 outputs the packet generated by the corresponding packet generator 107 through an output unit 110. The transmission channel controller 108 waits for the next cycle start packet after all the channels have been enabled.

FIG. 3 chronologically illustrates the packets output from the transmission device 100 to the bus cable in time-series. In FIG. 3, sections divided by broken lines 131 represent isochronous (ISO) cycles. Packets P1, P2, and P3 for every one of the channels are transferred in each ISO cycle. The packet P1, which is transmitted from the CD reproduction device 101 to the output device, includes a header D1a, which is packet information, packet data D1b, which is a data portion of the packet, and a footer D1c, which is packet information. The packet P2, which is transmitted from the microphone 102 to the output device, includes a header D2a, packet data D2b, and a footer D2c. The packet P3, which is transmitted from the DVD reproduction device 103 to the output device, is formed by a header D3a, packet data D3b, and a footer D3c.

Japanese Laid-Open Patent Publication No. 2001-94575 describes a system that uses the isochronous transfer mode.

With regard to digital video data, the image quality has been improving and channels have increased. This has increased the amount of transmitted data. However, the bands for data transmittable by a transmission device have become insufficient. Thus, there is a shortcoming in that data cannot be transmitted.

SUMMARY

According to an aspect of the embodiments, a method for transmitting a packet including a packet data fragment and packet information with a transmission device, the method includes determining a concatenated quantity of packets based on size of the packet data fragment, generating a concatenated packet including packet data fragments corresponding to a plurality of first packets, wherein a number of the packet data fragments is determined based on the concatenated quantity, and packet information corresponding to the first packets, and transmitting the concatenated packet in any one of a plurality of communication cycles.

A further aspect of the present invention is a transmission device for transmitting a packet including a packet data fragment and packet information. The transmission device includes a packet generator which generates a concatenated packet for a plurality of first packets, the concatenated packet including packet data fragments of the first packets and packet information of one of the first packets. A concatenated quantity of the packet data fragments of the concatenated packet is determined based on size of the packet data fragment included in one packet. A transmission unit transmits the concatenated packet in one of a plurality of communication cycles, wherein a number of the communication cycles corresponds to the concatenated quantity.

Additional objects and advantages of the invention will be set forth in part in the description which follows, and in part will be obvious from the description, or may be learned by practice of the invention. The object and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF DRAWINGS

The invention, together with objects and advantages thereof, may best be understood by reference to the following description of the presently preferred embodiments together with the accompanying drawings in which.

DESCRIPTION OF EMBODIMENTS

Figure 1:
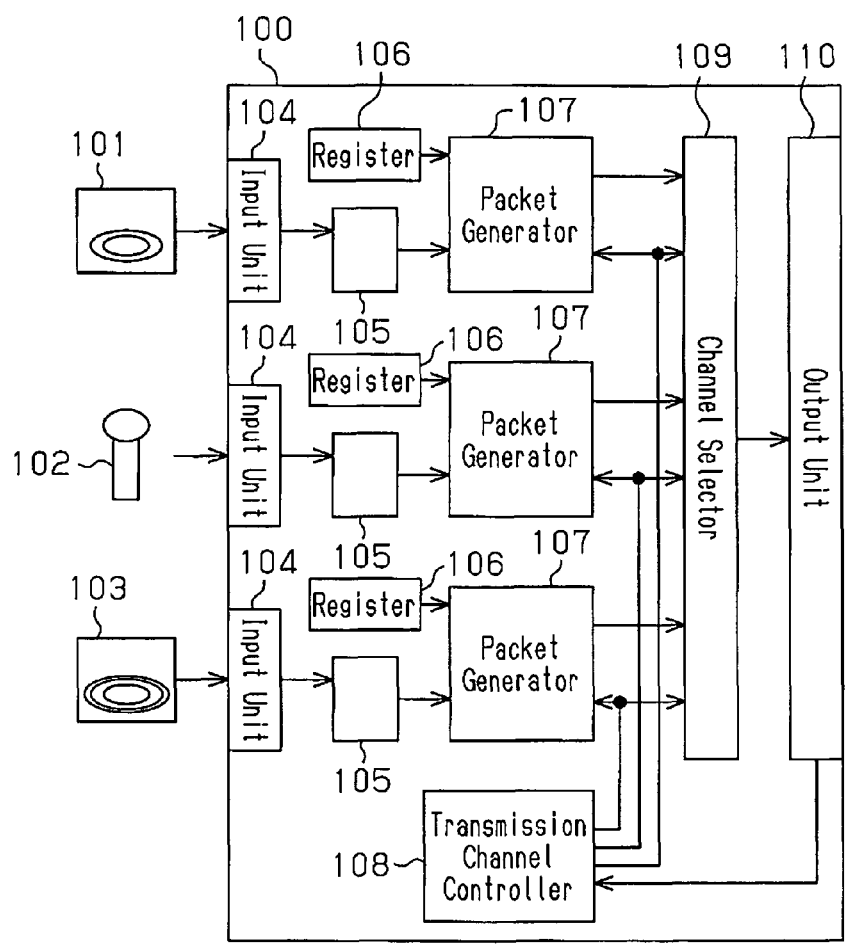
FIG. 1 is a block diagram illustrating a transmission device of the prior art.
Figure 2:
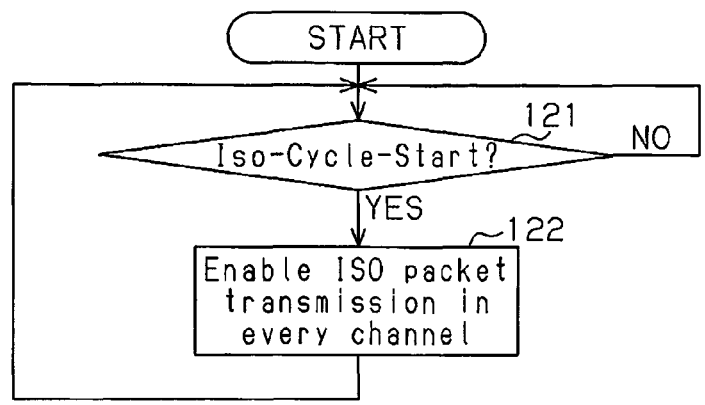
FIG. 2 is a flowchart illustrating an isochronous transfer process in the prior art.
Figure 3:
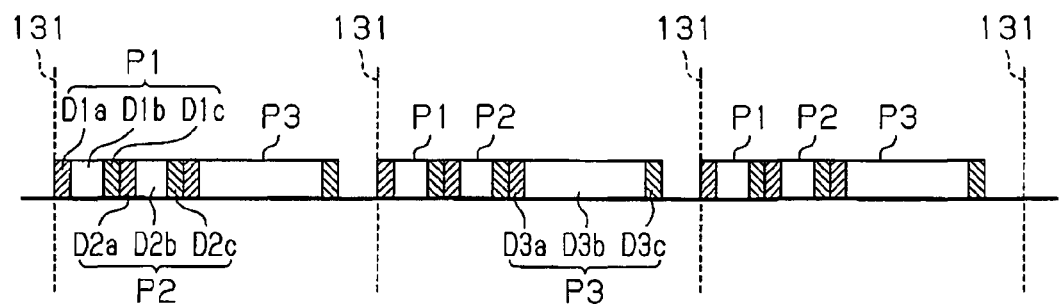
FIG. 3 is a schematic timing chart illustrating isochronous transfer data in the prior art.

In the drawings, like numerals are used for like elements throughout.

An embodiment of a transmission device 11 will now be discussed with reference to FIGS. 4 to 8.

Figure 4:
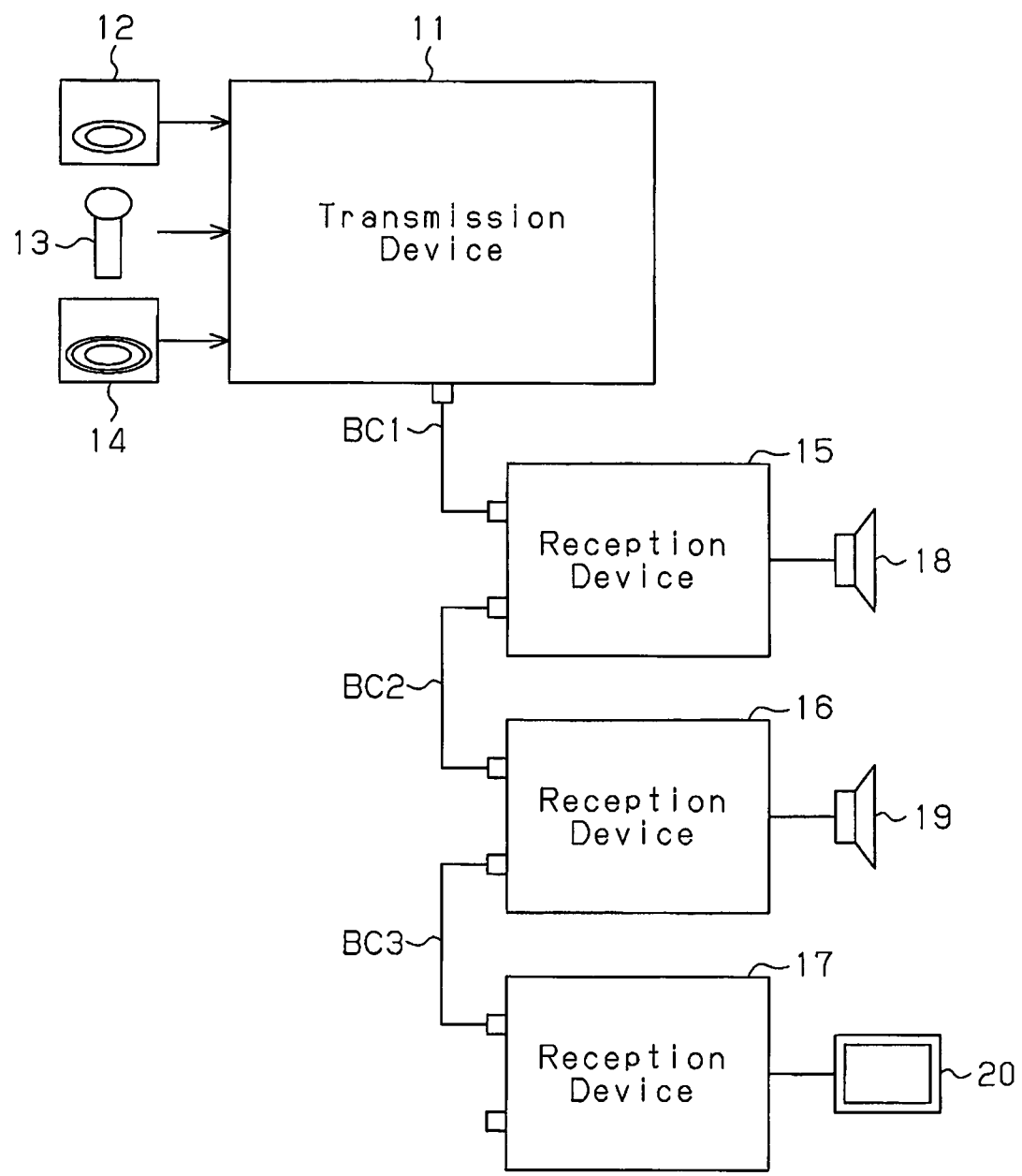
FIG. 4 is a schematic block diagram illustrating a transmission device and a reception device.

As shown in FIG. 4, the transmission device 11 has an input side to which are a CD reproduction device 12 serving as an audio reproduction device, a microphone 13 serving as an audio input device, and a DVD reproduction device 14 serving as a moving image reproduction device. Further, the transmission device 11 has an output side to which is coupled a reception device 15 by a bus cable BC1. The reception device 15 is coupled to a reception device 16 by a bus cable BC2. The reception device 16 is coupled to a reception device 17 by a bus cable BC3. The reception devices 15 and 16 are respectively coupled to speakers 18 and 19, which serve as audio output devices. The reception device 17 is coupled to a display 20, which serves as a moving image output device.

The bus cables BC1 to BC3 comply with the IEEE 1394 standard. That is, the transmission device 11 is designed to have a system architecture that is in accordance with an IEEE 1394 standard protocol. The transmission device 11 stores information of channels for transferring data. Such channel information includes information indicating the transmission source of data (transmission source address) and information indicating the transmission destination of data (transmission destination address). For example, data (audio) read from a CD by the CD reproduction device 12 is output from the speaker 18, sound input to the microphone 13 is output from the speaker 19, and data (video and audio) read from a disc by the DVD reproduction device 14 is output from the display 20. In this case, the transmission device 11 stores information associating the CD reproduction device 12 with the speaker 18, information associating the microphone 13 with the speaker 19, and information associating the DVD reproduction device 14 with the display 20. The transmission device 11 configures a topology with the reception devices 15 to 17 in accordance with the IEEE 1394 standard. Accordingly, in accordance with the IEEE 1394 standard, the transmission device 11 stores identification information (node addresses) of the devices 12 to 14 in relation with coupling ports of the corresponding reception devices 15 to 17. That is, the transmission device 11 stores the node address of the reception device 15, which is coupled to the speaker 18, as channel information (transmission destination address) for the port coupled to the CD reproduction device 12. Further, the transmission device 11 stores the node address of the reception device 16, which is coupled to the speaker 19, as channel information (transmission destination address) for the port coupled to the microphone 13. The transmission device 11 also stores the node address of the reception device 17, which is coupled to the display 20, as channel information (transmission destination address) for the port coupled to the DVD reproduction device 14.

The IEEE 1394 standard specifies an isochronous transfer mode in which data transmission is performed in a given cycle (125 μs, isochronous (ISO) cycle). In the isochronous transfer mode, the transmission device 11 transmits packets including the data input from the devices 12 to 14 to the corresponding reception devices 15 to 17. A packet transmitted by the transmission device 11 is formed by a header including the transmission source address and the transmission destination address, packet data such as digital video and audio data, and a footer including an error-correcting code.

Each of the reception devices 15 to 17 determines whether or not to process the received packet based on the header of the packet. For instance, the reception device 15 determines whether or not the transmission destination address of the packet received from the transmission device 11 is its node address. The reception device 15 processes the received packet if the transmission destination address is the similar as its node address. The reception device 15 may also transfer the received packet to a further device.

The transmission device 11 splits the data input from the CD reproduction device 12 into data fragments, with each data fragment having a given size. Then, the transmission device 11 generates a packet including a data fragment (packet data fragment) and a header, which includes the node address (transmission destination address) of the reception device 15. Therefore, when receiving the packet from the transmission device 11, the reception device 15 determines that the transmission destination address of the packet is its node address and transmits the packet data fragment in the received packet to the speaker 18. The speaker 18 generates an audio output based on the received packet data fragment.

In the similar manner, the transmission device 11 divides the data input from the microphone 13 into packet data fragments, with each packet data fragment having a given size. Then, the transmission device 11 generates a packet including a packet data fragment and a header, which includes the node address (transmission destination address) of the reception device 16. Therefore, when receiving the packet from the transmission device 11, the reception device 15 determines that the transmission destination address of the packet differs from its node address and further transmits the received packet to the reception device 16. When receiving the packet from the reception device 15, the reception device 16 determines that the transmission destination address is its address and transmits the packet data fragment included in the received packet to the speaker 19. The speaker 19 generates an audio output based on the received packet data.

Therefore, when receiving the packet from the transmission device 11, the reception device 15 determines that the transmission destination address of the packet received from the transmission device 11 is different from its node address, and transfers the received packet to the reception device 16. The reception device 16 determines that the transmission destination address of the packet received from the reception device 15 is its node address, and transmits the packet data fragment included in the received packet to the speaker 19. The speaker 19 outputs sound based on the received packet data fragment.

In the similar manner, the transmission device 11 divides the data input from the DVD reproduction device 14 into packet data fragments, with each packet data fragment having a given size. Then, the transmission device 11 generates a packet including a packet data fragment and a header, which includes the node address (transmission destination address) of the reception device 17. The transmission destination address of the packet differs from the node addresses of the reception devices 15 and 16. Therefore, the reception device 15 transfers the packet received from the transmission device 11 to the reception device 16, and the reception device 16 transfers the packet received from the reception device 15 to the reception device 17. The reception device 17 determines that the transmission destination address of the packet received from the reception device 16 is its node address and transmits the packet data fragment included in the received packet to the display 20. The display 20 displays a moving image and generates an audio output based on the received packet data.

The structure of the transmission device 11 will now be described.

Figure 5:
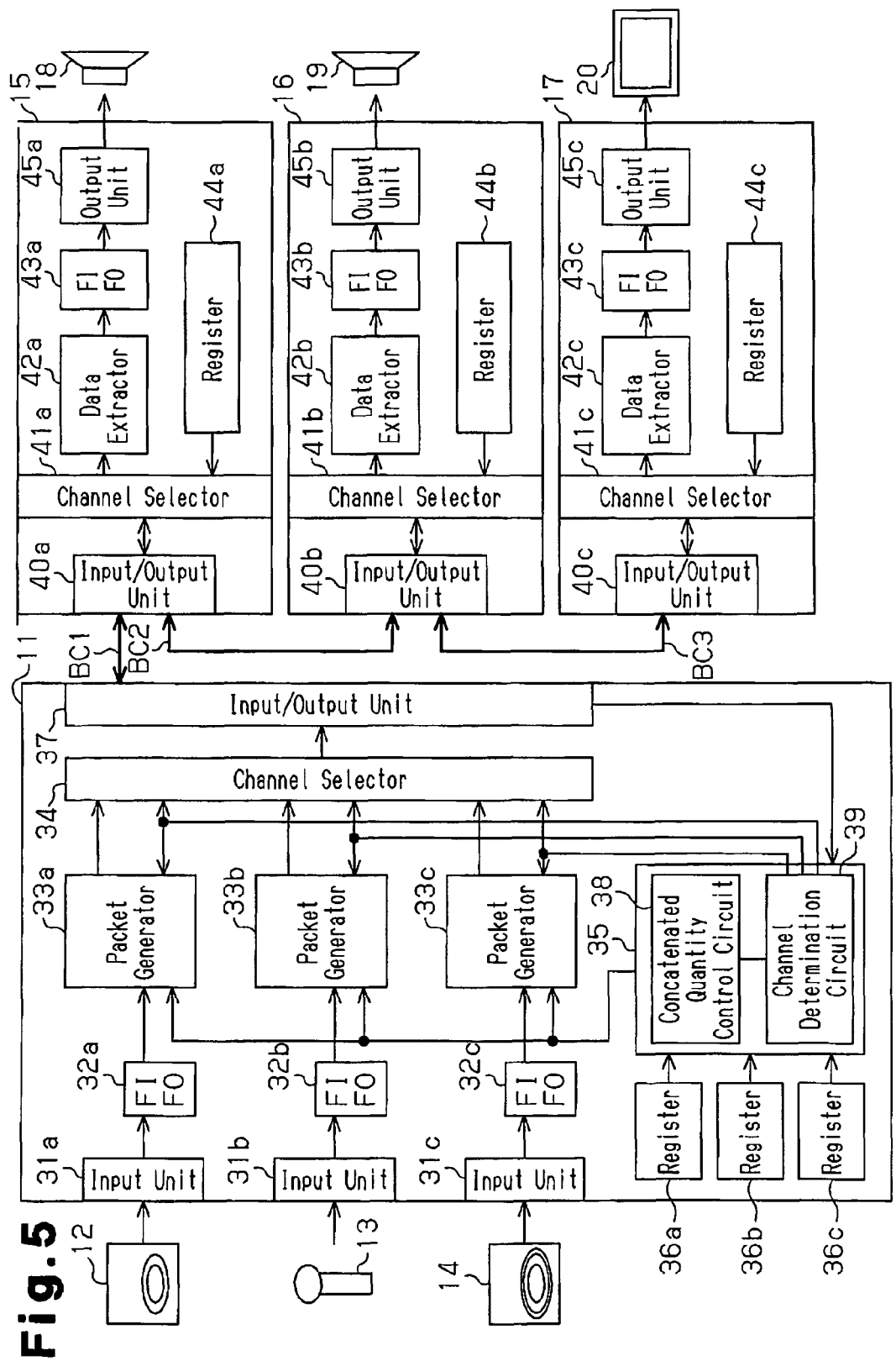
FIG. 5 is a schematic block diagram illustrating the transmission device and the reception device of FIG. 4.

With reference to FIG. 5, the CD reproduction device 12, the microphone 13, and the DVD reproduction device 14 respectively provide input units 31a, 31b, and 31c of the transmission device 11 with digital data. The CD reproduction device 12 reads digital data from an optical disc and provides the digital data to the input unit 31a. The microphone 13 performs analog to digital conversion to convert sound to a digital signal and provides the converted digital signal to the input unit 31b. The DVD reproduction device 14 reads digital data from an optical disc and provides the digital data to the input unit 31c.

The input units 31a, 31b, and 31c respectively provide the input data to the first-in first-out (FIFO) memories (hereinafter simply referred to as FIFOs) 32a, 32b, and 32c. The FIFOs 32a, 32b, and 32c store the input data from the input unit 31a, 31b, and 31c and provide the stored data to packet generators 33a, 33b, and 33c, respectively, through FIFO processing.

The packet generators 33a to 33c are coupled to a transmission channel controller 35. The transmission channel controller 35 provides each of the packet generators 33a to 33c with packet generation information, which includes a transmission destination address and which may be necessary for packet generation. The packet generators 33a to 33c respectively generate packets based on the packet data read from the FIFOs 32a to 32c and the corresponding packet generation information. Each of the packet generators 33a to 33c provides a packet to a channel selector 34 in response to a transmission enable signal generated by the transmission channel controller 35.

The transmission enable signal generated by the transmission channel controller 35 is also provided to the channel selector 34. The channel selector 34 sequentially selects a plurality of channels according to the transmission enable signal, receives a packet from the packet generator corresponding to the selected channel, and provides the received packet to an input/output unit 37. The input/output unit 37 converts the packet provided from the channel selector 34 to an electric signal, and outputs the converted signal. In FIG. 5, the transmission channel controller 35, the channel selector 34, and the input/output unit 37 form a transmission unit.

The input/output unit 37 monitors signals (control packets) transferred by an IEEE 1394 bus (bus cable BC1). When receiving a cycle start packet, the input/output unit 37 provides a cycle start signal to the transmission channel controller 35. The transmission channel controller 35 determines whether or not the input/output unit 37 has received a cycle start packet based on the cycle start signal and outputs a transmission enable signal in accordance with the determination.

The transmission channel controller 35 includes a concatenated quantity control circuit 38 and a channel determination circuit 39. The transmission channel controller 35 is coupled to registers 36a, 36b, and 36c, which correspond to three different channels. Each of the register 36a to 36c stores size information of the packet data fragments transferred by each channel. The transmission channel controller 35 provides the size information stored in the register 36a to 36c to the corresponding packet generator 33a to 33c.

The size information indicates the amount of packet data included in one packet. The size information is set in accordance with the type of packet data that is transferred. For example, for the CD reproduction device 12 and the microphone 13, the amount of packet data included in a packet is the amount allowing continuous audio reproduction. For the DVD reproduction device 14, the amount of packet data included in a packet is the amount allowing continuous image and audio reproduction. When a device is coupled to any of the input units 31a to 31c, the transmission device 11 receives size information from the coupled device and stores the size information in the register corresponding to that input unit. For example, in FIG. 5, when the CD reproduction device 12 is coupled to the input unit 31a, the transmission device 11 stores the size information received from the CD reproduction device 12 in the register 36a.

The concatenated quantity control circuit 38 determines the quantity of packet data fragments that are to be concatenated based on the packet data size information for each channel read from the registers 36a to 36c.

The transmission device 11 concatenates a plurality of separate packets that are transferred to the similar transmission destination address over a plurality of ISO cycles to generate a single packet. A normal packet (i.e., non-concatenated packet) is transferred in each ISO cycle and differs from a concatenated packet generated by concatenating packets.

A concatenated packet is transferred in the similar manner as a normal packet via the IEEE 1394 bus (bus cables BC1 to BC3) to a device having the similar transmission destination address. Therefore, a concatenated packet requires only one header and one footer, for example. Thus, the band (or transfer time) required for transmitting a single concatenated packet is small compared to the band required for transmitting a plurality of normal packets, for example. The time of one ISO cycle is fixed. Accordingly, the usable band in one ISO cycle increases when transmitting a single concatenated packet instead of a plurality of normal packets. This allows for an increase in the quantity of channels that may be included in one ISO cycle. In other words, data may be transferred to more devices in one ISO cycle.

The quantity of normal packets concatenated to generate a concatenated packet is referred to as the concatenated quantity. The transmission channel controller 35 determines the type of packet to concatenate and the quantity of packets to concatenate based on the data amount (size information) stored in the registers 36a to 36c.

The packet generators 33a to 33c are coupled to the transmission channel controller 35 and receive information required for packet generation such as the concatenated quantity, the size information, and the transmission destination address from the transmission channel controller 35, for example. Each of the packet generators 33a to 33c reads a packet data fragment having an amount determined based on the concatenated quantity and the size information from each of the FIFO 32a to 32c. Furthermore, each of the packet generators 33a to 33c generate a header and footer based on the read packet data fragment and the information required for packet generation, for example. Each of the packet generators 33a to 33c then generates a concatenated packet including the header, a packet data fragment (concatenated packet data fragment), and the footer.

The size (data amount) of a concatenated packet generated by concatenating normal packets in the above manner is smaller than the total size of the normal packets prior to the concatenation by an amount corresponding to the header and footer, which do not have to be concatenated. For example, if an n number of normal packets are concatenated to generate one concatenated packet, the amount of transfer data is reduced by the size of an (n−1) number of headers and footers.

The transmission device 11 generates concatenated packets not to reduce data transfer time but rather to reduce the band used in the isochronous transfer mode, that is, to reduce the amount of transferred data. For example, one concatenated packet may be transmitted in one cycle instead of transmitting two normal packets in two cycles to the similar destination. In this case, the transmission device 11 transmits a concatenated packet to a different transmission destination address in the next ISO cycle and does not transmit a concatenated packet to the similar transmission destination address. In other words, the transmission device 11 intermittently transmits concatenated packets having the similar transmission destination address in different ISO cycles. As a result, in an ISO cycle from which a packet has been eliminated due to the concatenation, by using the band that has become vacant because of the concatenated packet and a band unused from the beginning, a normal packet for a different transmission destination address may be transmitted.

As described above, the transmission channel controller 35 determines the concatenated quantity based on the type or the size of the packet data. For video data, one packet includes more packet data than audio data. As a result, the transfer of a concatenated packet of video data in one ISO cycle may not be possible and the transfer of other packets may be hindered. Therefore, the transmission channel controller 35 preferably sets the concatenated quantity to "1", that is, prohibits packet concatenation in the packet generator that generates packets including the video data.

The packet transmitted from the transmission device 11 is received by a channel selector 41a through an input/output unit 40a of the reception device 15. The channel selector 41a compares the transmission destination address stored in the header of the received packet with channel information (node address) stored in a register 44a to determine whether or not the reception device 15 is the destination of the received packet. If the node address of the channel information is the similar as the transmission destination address, the channel selector 41a provides the received packet to a data extractor 42a. If the node address of the channel information and the transmission destination address may not be the same, the channel selector 41a transfers the received packet to the reception device 16.

The data extractor 42a extracts packet data from the packet in accordance with the data size recorded in the header of the packet, and provides the packet data to a FIFO 43a serving as a data storage memory. The FIFO 43a stores the packet data from the data extractor 42a, and sequentially provides the stored packet data to an output unit 45a. The speaker 18 serving as the output device is coupled to the output unit 45a. The output unit 45a provides the packet data from the FIFO 43a to the speaker 18. The speaker 18 generates an audio reproduction of the packet data provided from the output unit 45a.

The reception devices 16 and 17 have structures that are the similar as the reception device 15. Therefore, corresponding elements of the reception devices 16 and 17 and the reception device 15 are denoted with the similar reference numerals although character [a] is changed to [b] or [c]. Such elements will no be described.

A concatenated quantity determination process executed by the concatenated quantity control circuit 38 will now be discussed.

Figure 6:
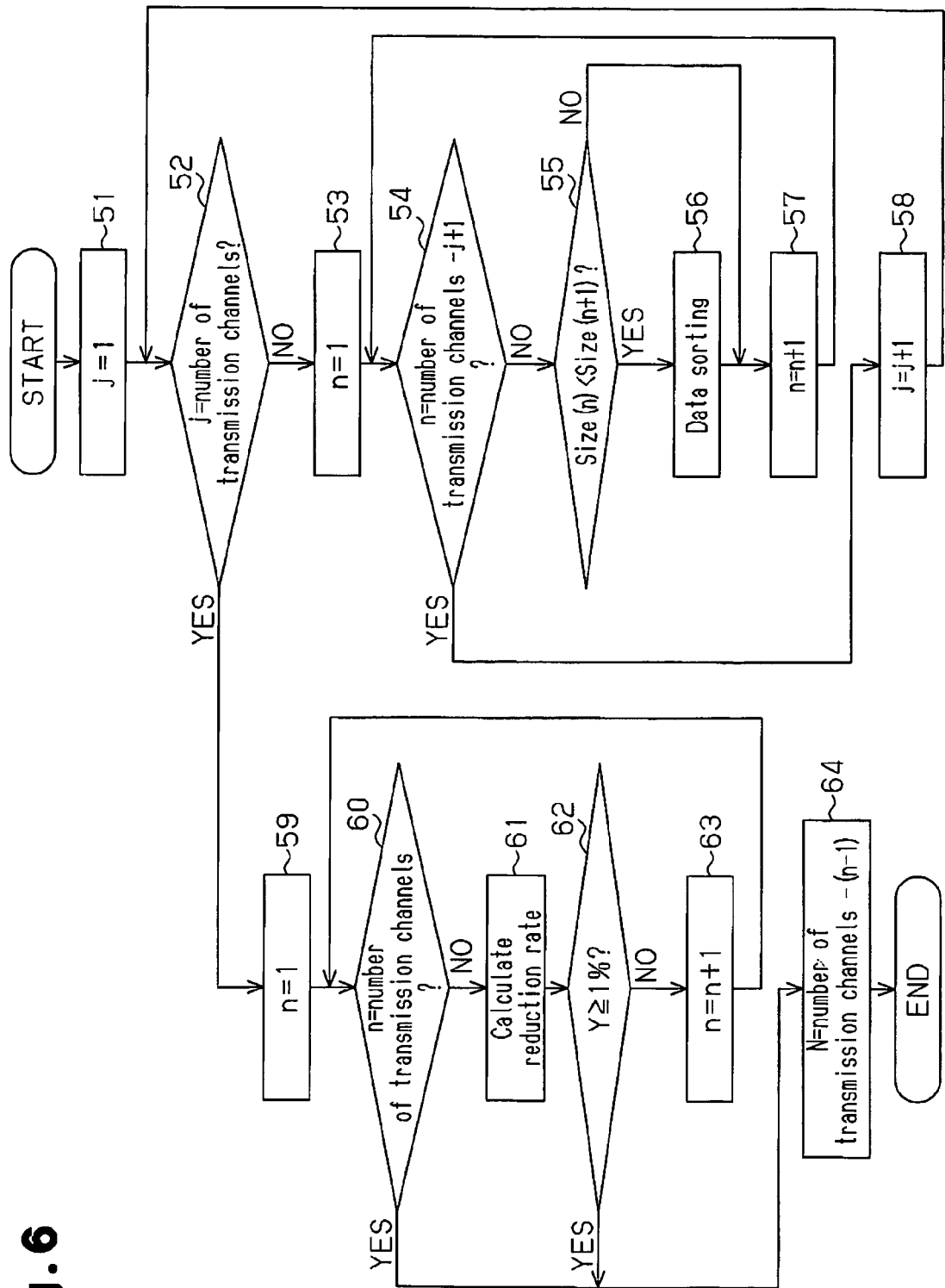
FIG. 6 is a schematic flowchart illustrating an isochronous transfer process.

The control circuit 38 executes the concatenated quantity determination process (operations 51 to 64) illustrated in FIG. 6 to determine the concatenated quantity of the packet data fragments for each channel. The concatenated quantity determination process includes a channel number sorting process (operations 51 to 58), which sorts channel numbers in accordance with data size (e.g., packet size), and a concatenated quantity determination process, which determines the concatenated quantity for each channel (operations 59 to 64). The channel numbers are given. In the example of FIG. 5, the number of the channel corresponding to the packet generator 33a is "1", the number of the channel corresponding to the packet generator 33b is "2", and the number of the channel corresponding to the packet generator 33c is "3".

The channel number sorting process (operations 51 to 58) will first be described.

In operation 51, the control circuit 38 performs an initialization process. The initialization process initializes a counter j (set j to 1) and stores a record including the data size for each channel number (data size specified for each channel) in a register (not shown) of the control circuit 38. Three records are stored in the register of the control circuit 38 through this process.

In operation S52, the control circuit 38 compares the counter j and the quantity of transmission channels. The quantity of transmission channels is the total quantity of channels that are selectable by the channel selector 34 and is equal to the quantity of input units coupled to external devices. In FIG. 5, devices 12 to 14 are coupled to the three input units 31a to 31c, and thus the quantity of transmission channels is "3". That is, in operation 52, the control circuit 38 determines whether or not the processes from operation 53 to operation 57 have been completed for every one of the channels. If the processes of operations 53 to 57 have not been completed for every one of the channels, that is, if there is an unprocessed channel, the control circuit 38 proceeds to operation 53. If the processes of operations 53 to 57 have been completed for every one of the channels, the control circuit 38 proceeds to operation 59 to execute the next concatenated quantity determination process.

In operation 53, the control circuit 38 initializes a subject number n indicating the record that is subject to processing (hereinafter referred to as subject record) (n is set at 1).

In operation 54, the control circuit 38 compares the subject number n and the [quantity of transmission channels−j+1] to determine whether or not the subject record is the final record (in this case, n=3). If the subject record is not the final record (operation 54: NO), the control circuit 38 proceeds to operation 55.

In operation 55, the control circuit 38 compares the data size S(n) of the subject record and the data size S(n+1) of the next subject record. If the data size of the subject record is smaller than the data size of the next subject record (operation 55: YES), the control circuit 38 proceeds to operation 56. If the data size of the subject record is greater than or equal to the data size of the next subject record (operation 55: NO), the control circuit 38 proceeds to operation 57.

In operation 56, the control circuit 38 exchanges the content of the subject record with the content of the next subject record. As a result of this process, the data size stored in the (n)th record becomes greater than the data size stored in the (n+1)th record.

In operation 57, the control circuit 38 increments (+1) the subject number n to change the subject record. The control circuit 38 then proceeds to operation 54. If the subject record is the final record (operation 54: YES), the control circuit 38 proceeds to operation 58. In operation 58, the control circuit 38 increments (+1) the counter j and then proceeds to operation 52.

In this manner, the control circuit 38 repeats operations 53 to 57 for a number of times that is the similar as the quantity of transmission channels so that the three records respectively store the packet data sizes for the three channels, which are sorted in accordance with size from the largest one (in descending order).

The concatenated quantity determination process (operations 59 to 64) will now be discussed.

In operation 59, the control circuit 38 initializes the subject number n indicating the subject record (set n=1). In this case, the record corresponding to n=1 is the record storing the largest data size of the three records.

In operation 60, the control circuit 38 compares the subject number n and the quantity of transmission channels. The control circuit 38 proceeds to operation 64 if the subject number n and the quantity of transmission channels are equal (operation 60: YES). The control circuit 38 proceeds to operation 61 if the subject number n and the quantity of transmission channels are not equal (operation 60: NO).

In operation 61, the control circuit 38 calculates a reduction rate Y of the packet size. The reduction rate Y is the amount of data reduced by concatenating the packets, that is, the reduced amount of the transfer data. The reduction rate Y is obtained from the equation of:

$$Y=((SO-SN)/SO)\times 100(\%)$$

where N represents the concatenated quantity of packets, SO represents the size of an N number of normal packets that are concatenated, and SN represents the size of the concatenated packet.

A normal packet and a concatenated packet each include a header, a packet data fragment, and a footer. The reduction rate of a packet having a large data size is smaller than the reduction rate of a packet having a small data size. Thus, the reduction rate decreases as the amount of packet data included in a normal packet increases. The control circuit 38 determines the largest one of all the data sizes set for the channels that enable reduction in the transfer data amount in a single ISO cycle when generating the concatenated packet. Then, the control circuit 38 generates concatenated packets for all channels set with a data size smaller than or equal to the largest data size enabling reduction in the transfer data amount.

When the three channels are sorted out in accordance with data size as described above, the control circuit 38 calculates the reduction rate Y of the packet size from channels having larger data sizes. When calculating the reduction rate Y for each channel, the control circuit 38 sets the quantity of channels set with a data size that is smaller than or equal to the data size of the subject channel as the concatenated quantity N of packet data fragments. In this case, the concatenated quantity N is expressed using the subject number n of a record as follows:

$$N=\text{quantity of transmission channels}-(n-1).$$

The amount of data reduced by concatenating packets corresponds to a value obtained by multiplying [concatenated quantity N−1] by the size of one set of a header and footer. Therefore, the reduction rate Y is expressed by the equation of:

$$Y=\{(H+F)\times(N-1)\}/\{(H+F+D)\times N\}\times 100(\%)$$

where H represents the size of the header, D represents the size of the packet data, F represents the size of the footer, and N represents the concatenated quantity.

The control circuit 38 proceeds to operation 62 after calculating the reduction rate Y in operation 61.

In operation 62, the control circuit 38 compares the reduction rate Y with a first given threshold value. The first threshold value is a value of the reduction rate at which the transfer data amount may be reduced by generating the concatenated packet in place of the normal packet and is set based on a simulation, or the like. The first threshold value is preferably set to 1(%). The control circuit 38 proceeds to operation 64 if the reduction rate Y is greater than or equal to "1" and proceeds to operation 63 if the reduction rate Y is less than "1".

If the reduction rate Y is less than "1", the control circuit 38 determines that the transfer data amount would not be reduced by a concatenated packet in the channel of the subject record. In this case, in operation 63, the control circuit 38 increments (+1) the subject number n to determine whether to perform concatenation in the channel of the next subject record, that is, the channel having the next largest data size and proceeds to operation 60. In this manner, the control circuit 38 checks whether or not concatenation is effective from data having larger sizes. When determining that concatenation is effective in a channel, that is, when the reduction rate Y of the data size is greater than or equal to the first threshold value "1" (operation 62: YES), the control circuit 38 proceeds to operation 64, and determines the concatenated quantity N based on the above equation.

If the subject number n is equal to the quantity of transmission channels in operation 60 (YES), that is, if there are no channels in which concatenation is effective, the control circuit 38 sets the concatenated quantity N as "1" in operation 64.

The control circuit 38 stores the set concatenated quantity N in the registers 36a to 36c of for the channels. In this case, the control circuit 38 stores the set concatenated quantity N (greater than or equal to two and less than or equal to the quantity of transmission channels) in the register of a channel in which the reduction rate Y is greater than or equal to the first threshold value, and the concatenated quantity is set as "1" in the register of a channel in which the reduction rate Y is less than the first threshold value.

A channel determination process executed by the channel determination circuit 39 based on the set concatenated quantity N will now be discussed.

Figure 7:
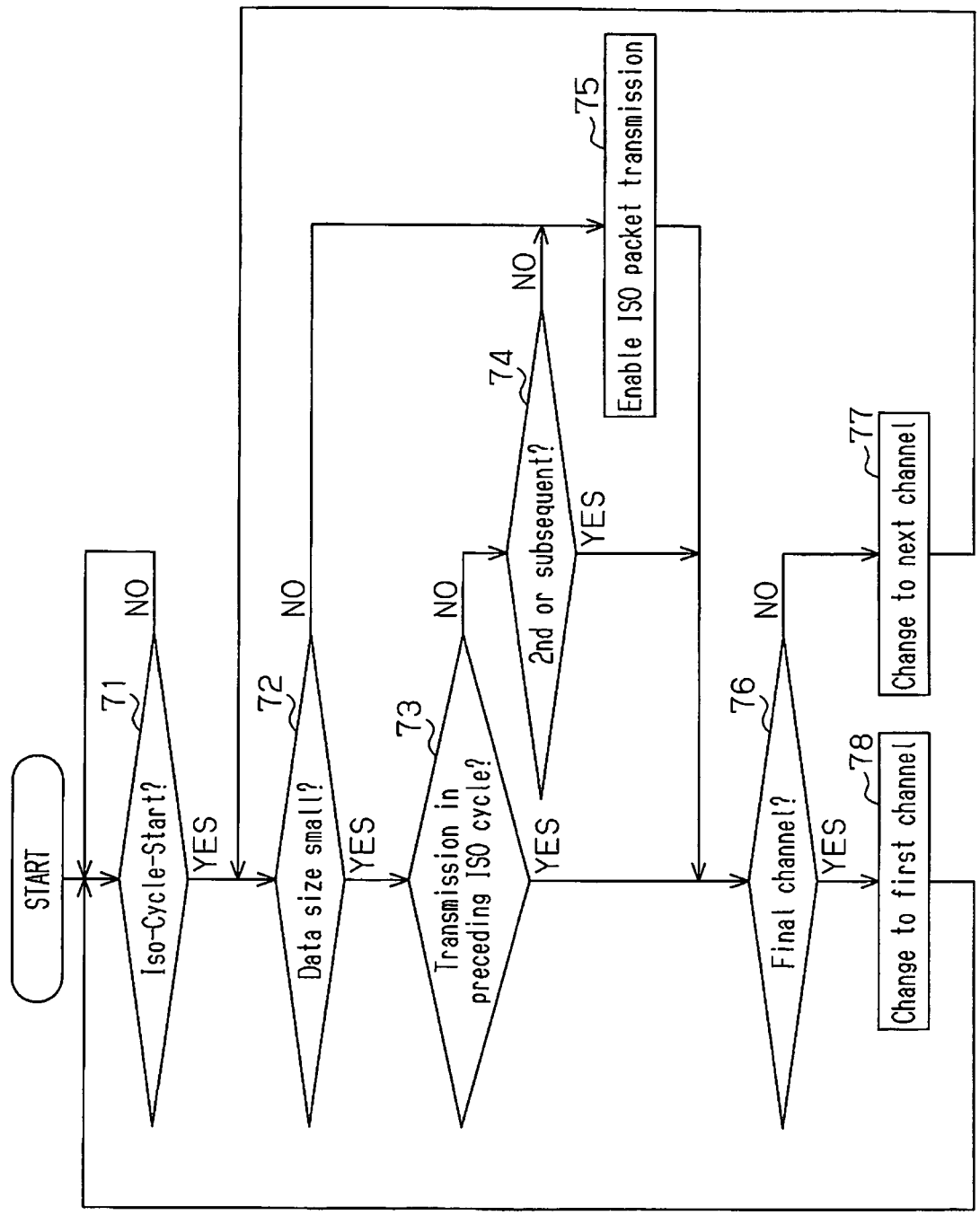
FIG. 7 is a schematic flowchart illustrating the isochronous transfer process.

The channel determination circuit 39 determines the channel allowed to be transmitted in each ISO cycle by executing the processes of operations 71 to 78 illustrated in FIG. 7. In other words, the channel determination circuit 39 determines for every ISO cycle whether or not to transmit a packet for each channel. The channel determination circuit 39 then outputs an enable signal in accordance with the channel that is transmit.

In operation 71, the channel determination circuit 39 determines whether or not a cycle start signal has been received. The cycle start signal indicates that the input/output unit 37 has received a cycle start packet (Iso-Cycle-Start) from a cycle master (not shown). The cycle start packet is provided to the input/output unit 37 at the beginning of ISO cycles. If the cycle start signal is not received (operation 71: NO), the channel determination circuit 39 continues to wait. If the cycle start signal is received (operation 71: YES), the channel determination circuit 39 proceeds to operation 72.

In operation 72, the channel determination circuit 39 determines the reduction rate Y for the channel that is first subjected to processing and further determines whether or not the data size of that subject is small. The data size is small in a packet having a large reduction rate Y, and the data size is large in a packet having a small reduction rate. For example, the channel determination circuit 39 determines that the data size is small if the reduction rate Y is greater than or equal to a second given threshold value, and determines that the data size is large if the reduction rate is less than the second threshold value.

The second threshold value is preferably set to a value that is the similar as the first threshold value (1%) used in operation 62 of FIG. 6. Accordingly, in the determination of operation 72, a channel having a small data size becomes a channel for which concatenated packets are transmitted, and a channel having a large data size becomes a channel for which normal packets are transmitted.

The channel determination circuit 39 proceeds to operation 73 when determining that the data size is small, that is, the subject channel is a channel for transmitting concatenated packets (operation 72: YES). The channel determination circuit 39 proceeds to operation 75 when determining that the data size is large, that is, the subject channel is a channel in which concatenated packets are not transmitted (normal packets are transmitted) (operation 72: NO).

In operation 73, the channel determination circuit 39 determines whether or not a concatenated packet was transmitted for the subject channel in the previous ISO cycle. The channel determination circuit 39 stores a transmitted flag for each channel in a register (not shown) and refers to the flag to determine whether or not a concatenated packet has been transmitted. For example, the channel determination circuit 39 determines that a concatenated packet has been transmitted when the transmitted flag is "1" and determines that a concatenated packet has not been transmitted when the transmitted flag is "0".

As illustrated in FIG. 6, two or more channels are set to transmit concatenated packets (i.e., concatenated quantity N is two or greater). Thus, the channel that transmitted a concatenated packet in the preceding ISO cycle does not transmit a concatenated packet in the next ISO cycle. Accordingly, if a subject channel has transmitted a packet in the preceding ISO cycle (operation 73: YES), the channel determination circuit 39 proceeds to operation 76 to perform determinations for the next channel. If the subject channel has not transmitted a packet in the preceding ISO cycle (operation 73: NO), the channel determination circuit 39 proceeds to operation 74.

In operation 74, the channel determination circuit 39 determines whether or not the subject channel is a second or subsequent channel that has not transmitted a packet in the preceding ISO cycle. As described above, the quantity of channels that transmit concatenated packets is the similar as the concatenated quantity N (N≧2). Accordingly, the transmission device 11 transmits concatenated packets for an N number of channels, in which the N number is the similar as the concatenated quantity N of two or greater. In addition, the transmission device 11 transmits a concatenated packet using one channel in one ISO cycle. Accordingly, the transmission device 11 transmits concatenated packets related to different channels in different ISO cycles. Further, the transmission device 11 transmits concatenated packets related to the similar channel once for every N number of ISO cycles, in which the N number is the similar as the concatenated quantity N. To perform transmission of concatenated packets with this process, when a plurality of channels have not transmitted a concatenated packet in a preceding ISO cycle, the channel determination circuit 39 provides an enable signal to a first channel so as to transmit a concatenated packet but does not provide an enable signal to a second or subsequent channel so as not to transmit a concatenated packet. In this case, the first channel that has not transmitted a concatenated packet is a channel for which the transmitted flag is first determined as being set to "0".

For example, when a first channel that has not transmitted a concatenated packet is detected, the channel determination circuit 39 increments (+1) the count value of a determination counter (not shown). Afterward, the channel determination circuit 39 increments the count value whenever a channel that has not transmitted a concatenated packet is detected. The channel determination circuit 39 resets the count value to "1" when one ISO cycle is completed. Thus, the subject channel is the first channel when the count value is "1", and the subject channel is the second or subsequent channel when the count value is "2" or greater. Accordingly, the channel determination circuit 39 determines whether or not the subject channel is the second or subsequent channel based on the count value of the determination counter, proceeds to operation 75 when the first channel is detected, and proceeds to operation 76 when the second or subsequent channel is detected.

In operation 75, the channel determination circuit 39 transmits an enable signal for enabling packet transmission in the subject channel. Each of the packet generators 33a to 33c transmits a normal packet or a concatenated packet in response to an enable signal corresponding to its circuit. Furthermore, the channel selector 34 selects the transmission channel in accordance with the enable signal and transmits to the input/output unit 37 a packet from the packet generator corresponding to the transmission channel. Accordingly, the transmission device 11 transmits a normal packet or a concatenated packet from the packet generator corresponding to the enable signal to the reception device 15 through the channel selector 34 and the input/output unit 37. In this case, when the subject channel is a channel that transmits a concatenated packet, the channel determination circuit 39 sets the transmitted flag for the channel to "1" and increments (+1) the count value of the determination counter. Then, the channel determination circuit 39 proceeds to operation 76.

In operation 76, the channel determination circuit 39 determines whether or not the subject channel is the final channel. If the subject channel is not the final channel (operation 76: NO), the channel determination circuit 39 changes the subject channel to the next channel in operation 77, and returns to operation 72.

If the subject channel is the final channel (operation 76: YES), in operation 78, the channel determination circuit 39 changes the subject channel to the first channel and returns to operation 71. Therefore, the channel determination circuit 39 repeats the processes of operations 72 to 77 for every one of the channels. A channel having a large data size transmits a normal packet in an ISO cycle during the repetitive process. Furthermore, a plurality of channels having small data sizes transmit a concatenated packet in an ISO cycle. Moreover, the channel determination circuit 39 changes the channel that transmits a concatenated packet in each ISO cycle.

In operation 78, the channel determination circuit 39 resets the count value of the determination counter to "1" after changing the subject channel to the first channel. Furthermore, when transmission of concatenated packets is completed in channels that transmit concatenated packets, that is, when the transmitted flags of the channel are all set to "1", the channel determination circuit 39 clears the transmitted flags for each channel to "0".

The packets transmitted from the transmission device 11 to the reception devices 15 to 17 will now be described.

In one example, the reduction rate Y in the channels for transmitting in packets data input from the CD reproduction device 12 and the microphone 13, which are illustrated in FIG. 5, is greater than or equal to the threshold value "1", and the reduction rate Y in the channel for transmitting in packets data input from the DVD reproduction device 14 is smaller than the threshold value "1". In this case, the concatenated quantity control circuit 38 of the transmission channel controller 35 sets the concatenated quantity N to "2" in accordance with the flowchart shown in FIG. 6. Therefore, the packet generator 33*a* associated with the CD reproduction device 12 generates a concatenated packet including packet data fragments for two packets. In other words, the packet data fragment is doubled in data size. In the similar manner, the packet generator 33*b* associated with the microphone 13 generates a concatenated packet including packet data fragments for two packets. In other words, the packet data fragment is doubled in data size. However, the packet generator 33*c* associated with the DVD reproduction device 14 does not generate a concatenated packet. That is, the DVD reproduction device 14 generates a normal packet, which includes a packet data fragment for a single packet.

Figure 8A:
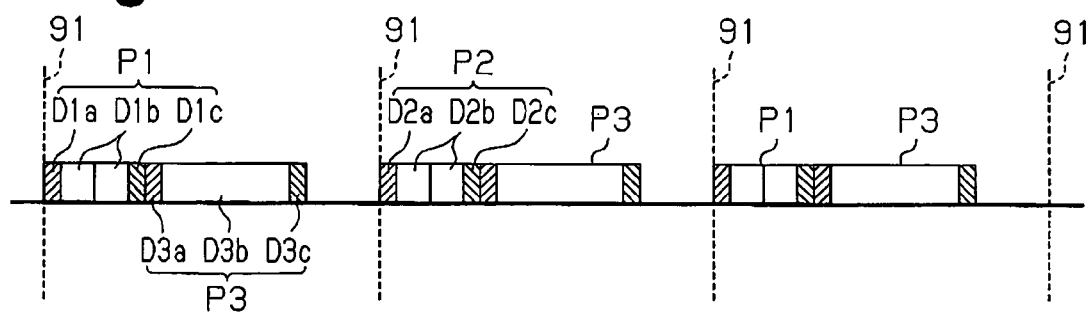
FIGS. 8A and 8B are schematic timing charts illustrating the isochronous transfer data.

When receiving a cycle start signal, the channel determination circuit 39 provides an enable signal to the packet generators 33*a* and 33*c* in accordance with the flowchart illustrated in FIG. 7. As a result, a concatenated packet P1, which is generated by the packet generator 33*a*, and a normal packet P3, which is generated by the packet generator 33*c*, are transmitted, as illustrated in the left part of FIG. 8A. The concatenated packet P1 includes a header D1*a*, two packet data fragments D1*b*, and a footer D1*c*. The normal packet P3 includes a header D3*a*, a single packet data fragment D3*b*, and a footer D3*c*. In FIG. 8A, broken lines 91 indicate the reception timing of a cycle start signal. Accordingly, the section between two broken lines 91 is one ISO cycle.

When receiving the next cycle start signal, the channel determination circuit 39 provides the enable signal to the packet generators 33*b* and 33*c* in accordance with the flowchart shown in FIG. 7. As a result, a concatenated packet P2, which is generated by the packet generator 33*b*, and a normal packet P3, which is generated by the packet generator 33*c*, are transmitted in one ISO cycle, as illustrated in the middle part of FIG. 8A. The concatenated packet P2 includes a header D2*a*, two packet data fragments D2*b*, and a footer D2*c*.

When receiving the next cycle start signal, the channel determination circuit 39 provides the enable signal to the packet generators 33*a* and 33*c* again. As a result, a concatenated packet P1, which is generated by the packet generator 33*a*, and a normal packet P3, which is generated by the packet generator 33*c*, are transmitted in one ISO cycle, as illustrated in the right part of FIG. 8A.

Figure 8B:
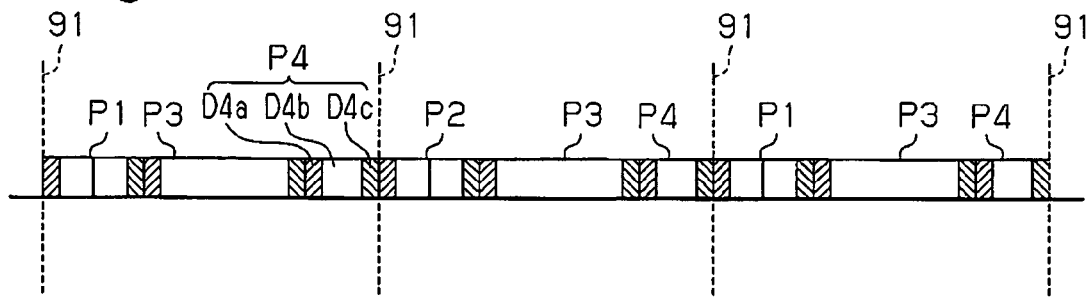

As described above, the transmission device 11 determines the concatenated quantity N in accordance with the reduction rate Y (reduced data amount) of the packet size in each channel to generate a concatenated packet by concatenating a number of normal packets, in which the number is the similar as the concatenated quantity N. Thus, the band of one ISO cycle, that is, the total amount of a signal transmitted in one ISO cycle is reduced compared to when transmitting only normal packets. This increases vacant time in the ISO cycle and enables the transmission of an additional packet (normal packet P4 including a header D4*a*, a packet data fragment D4*b*, and a footer D4*c*), as illustrated in FIG. 8B.

The transmission device 11 of the preferred embodiment has the advantages described below.

(1) The concatenated quantity control circuit 38 determines the concatenated quantity N based on the data size set for each channel. At least one of the packet generators 33*a* to 33*c* generates a concatenated packet including packet data fragments for normal packets, the quantity of which is the similar as the concatenated quantity N, and a set of a header and footer. The transmission device 11 transmits a concatenated packet once for every N number of ISO cycles, the quantity of which is the similar as the concatenated quantity N. In this manner, a concatenated packet includes the concatenated quantity of packet data fragments and a header and footer, which are included in a single packet. Thus, the amount of transfer data is small compared to when transmitting a plurality of normal packets in a plurality of communication cycles. As a result, a new packet becomes transmissible in a communication cycle that transmits a concatenated packet.

(2) The concatenated quantity control circuit 38 calculates the reduction rate Y for each channel based on the ratio between the size of the normal packet and the size of the concatenated packet to determine the concatenated quantity N of each channel based on the reduction rate Y. Accordingly, a channel in which the transfer data amount is reduced is easily determined by generating a concatenated packet based on the reduction rate Y.

(3) The concatenated quantity control circuit 38 compares the reduction rate Y and the first threshold value to determine the concatenated quantity N based on the comparison. Accordingly, a channel in which the transfer data amount is reduced is easily determined based on the first threshold value.

(4) The channel determination circuit 39 sequentially determines the data size set for each channel and provides the packet generators 33*a* to 33*c* with an enable signal based on the determination result the channel determination circuit 39 provides a packet generator for a channel that transfers data having a large size with an enable signal for transmitting a normal packet in each communication cycle. Further, the channel determination circuit 39 provides packet generators (two or more) for channels that transfer data having a small size with an enable signal for transmitting concatenated packets in different communication cycles. Accordingly, a normal packet for a channel that transfers data having a large size is transmitted in each ISO cycle. Thus, packets are transmitted and received without disrupting continuity. Further, the transmission and reception of packets are performed without the need for changing the buffer size of the transmission device 11 and the reception devices 15 to 17.

One concatenated packet is transmitted in each ISO cycle. The size of the data transferred in the channel that generates the concatenated packet is small. Thus, the transmission and reception of the packet are performed without changing the buffer size of the transmission device 11 and the reception devices 15 to 17. A concatenated packet includes packet data fragments, which would be included in a plurality of normal packets that are transmitted in a plurality of ISO cycles. Thus, even in an ISO cycle in which a concatenated packet is not transmitted, the data stored in the FIFOs 43*a* and 43*b* of the reception devices 15 and 16 is continuously output to the speakers 18 and 19, which are the output subjects. This continuously reproduces sound.

(5) The concatenated quantity control circuit 38 sorts and ranks the channel numbers allocated to a plurality of (three herein) channels in descending order in accordance with the data size set for each channel. Then, the concatenated quantity control circuit 38 sequentially calculates the reduction rate Y from channels having larger data sizes. Afterwards, the concatenated quantity control circuit 38 then subtracts one from the rank order of the channel in which the reduction rate Y is greater than or equal to the threshold value and then subtracts the obtained value from the total quantity of channels to ultimately determine the concatenated quantity N. In this case, the data size is small in the channel of which rank order is lower than the channel in which the reduction rate Y is greater than or equal to the threshold value (i.e., reduction rate Y is greater than or equal to the threshold value). Accordingly, the processing time is shorter than when compared the reduction rate Y and the threshold value for all of the channels, and the concatenated quantity N is determined in a short period of time.

It should be apparent to those skilled in the art that the present invention may be embodied in many other specific forms without departing from the spirit or scope of the invention. Particularly, it should be understood that the present invention may be embodied in the following forms.

In the above-described embodiment, the sorting scheme (procedures) executed by the concatenated quantity control circuit 38 may be changed in case of necessary, for example.

In the above-described embodiment, the concatenated quantity control circuit 38 may sort the channel information in accordance with data size in an ascending order.

In the above-described embodiment, the concatenated quantity control circuit 38 may preset a different value for the concatenated quantity of packet data fragments in a concatenated packet for each channel. In this case, the quantity of concatenated packet data fragments is less than or equal to the preset concatenated quantity. Thus, the buffer capability of the FIFO may become insufficient if the concatenated quantity of the packet data fragments is too large, and the output devices 18 to 20 may not be able to continuously reproduce moving images or sound. Therefore, it is preferable that the control circuit 38 of the transmission device 11 sets the upper limit value of the concatenated quantity of the packet data based on the buffer capability of the FIFO.

In the above-described embodiment, the data input to the transmission device 11 from the CD reproduction device 12, the microphone 13, and the DVD reproduction device 14 is transmitted in packet. However, a storage device such as a hard disk may be incorporated in or coupled to the transmission device 11 so that the data stored in the storage device is transmitted in packets.

In the above-described embodiment, the transmission device 11 includes the three input units 31*a* to 31*c*. However, a transmission device including one, two, or four or more input units may be employed.

The present examples and embodiments are to be considered as illustrative and not restrictive, and the invention is not to be limited to the details given herein, but may be modified within the scope and equivalence of the appended claims.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A method for transmitting a packet with a transmission device, the method comprising:
   determining a concatenated quantity of a plurality of first packets for a first channel based on size of each of the first packets, wherein the first packets for the first channel are able to be sequentially transmitted in a plurality of communication cycles;
   generating a first concatenated packet for the first channel based on the concatenated quantity, the first concatenated packet for the first channel including packet data fragments of the plurality of first packets for the first channel and packet information corresponding to the first packets for the first channel;
   transmitting the first concatenated packet for the first channel in any one of the plurality of communication cycles;
   generating a subsequent first concatenated packet for the first channel based on the concatenated quantity, the subsequent first concatenated packet for the first channel including packet data fragments of a plurality of subsequent first packets for the first channel, which follow the plurality of first packets for the first channel, and packet information corresponding to the subsequent first packets for the first channel, wherein each of the subsequent first packets for the first channel has the size of each of the first packets for the first channel; and
   after transmission of the first concatenated packet for the first channel, transmitting each subsequent first concatenated packet for the first channel in every N-th communication cycle, wherein N is the concatenated quantity and an integer greater than or equal to 2.

2. The method according to claim 1, further comprising:
   generating another concatenated packet for a plurality of second packets, the quantity of which corresponds to the concatenated quantity, wherein the another concatenated packet includes packet data fragments of the second packets and packet information of one of the second packets; and
   transmitting the another concatenated packet in another one of the plurality of communication cycles.

3. The method according to claim 2, wherein:
   the transmitting the concatenated packet includes transmitting a third packet along with the concatenated packet in the one of the plurality of communication cycles, the third packet including a packet data fragment and packet information for a single packet; and
   the transmitting the another concatenated packet includes transmitting the third packet along with the another concatenated packet in the another one of the plurality of communication cycles.

4. The method according to claim 1, wherein the transmission device has a plurality of channels, the method further comprising:
   transmitting the concatenated packet or a normal packet through one of the plurality of channels, in which the normal packet includes a packet data fragment and packet information for a single packet, and the concatenated packet is formed by concatenating the packet data fragments of normal packets transmitted through the one of the plurality of channels;

wherein the determining a concatenated quantity includes:
calculating a data reduction rate for the concatenated packet on each channel based on a ratio of the size of the concatenated packet that are concatenated by packet data fragments of the concatenated quantity of normal packets and the size of a quantity of normal packets that correspond to the concatenated quantity; and
determining a final concatenated quantity based on the data reduction rate.

5. The method according to claim 4, wherein the determining a final concatenated quantity based on the data reduction rate includes:
comparing the data reduction rate with a given threshold value; and
determining the quantity of channels for which the data reduction rate is greater than or equal to the threshold value as the final concatenated quantity.

6. The method according to claim 4, further comprising:
sequentially selecting one of two or more channels in which the data reduction rate is greater than or equal to the threshold value for each communication cycle; and
transmitting a single concatenated packet for the selected channel in each communication cycle.

7. The method according to claim 4, further comprising:
sorting and ranking the plurality of channels in descending order in accordance with data size set for each channel, wherein said a final concatenated quantity includes:
sequentially calculating the data reduction rate from channels having larger data sizes;
subtracting one from the rank of the channel in which the data reduction rate first becomes greater than or equal to the threshold value; and
subtracting the obtained value from the total number of channels to determine the final concatenated quantity.

8. A transmission device for transmitting a packet, the transmission device comprising:
a packet generator which generates a first concatenated packet for a first channel including packet data fragments of a plurality of first packets for the first channel and packet information corresponding to the plurality of first packets for the first channel based on a concatenated quantity which is determined based on size of each of the first packets for the first channel, wherein the first packets for the first channel are able to be sequentially transmitted in a plurality of communication cycles; and
a transmission unit which transmits the first concatenated packet for the first channel in any one of the plurality of communication cycles,
wherein the packet generator generates a subsequent first concatenated packet for the first channel based on the concatenated quantity, the subsequent first concatenated packet for the first channel including packet data fragments of a plurality of subsequent first packets for the first channel, which follow the plurality of first packets for the first channel, and packet information corresponding to the subsequent first packets for the first channel, each of the subsequent first packets for the first channel having the size of each of the first packets for the first channel, and
wherein after transmission of the first concatenated packet for the first channel, the transmission unit transmits each subsequent first concatenated packet for the first channel in every N-th communication cycle, wherein N is the concatenated quantity and an integer greater than or equal to 2.

9. The transmission device according to claim 8, further comprising:
a plurality of packet generators respectively arranged in correspondence with a plurality of channels and which each function as the packet generator, in which each of the plurality of packet generators transmits the concatenated packet or a normal packet through one of the plurality of channels, the normal packet including a packet data fragment and packet information for a single packet, and the concatenated packet is formed by concatenating the packet data fragments of normal packets transmitted through the one of the plurality of channels; and
a concatenated quantity control circuit which calculates a data reduction rate for the concatenated packet on each channel based on a ratio of the size of the concatenated packet that are concatenated by packet data fragments of the concatenated quantity of normal packets and the size of a quantity of normal packets that correspond to the concatenated quantity and determines a final concatenated quantity based on the data reduction rate;
wherein at least one of the plurality of packet generators generates the concatenated packet based on the final concatenated quantity determined by the concatenated quantity control circuit.

10. The transmission device according to claim 9, wherein the concatenated quantity control circuit compares the data reduction rate with a threshold value, and determines the quantity of channels in which the data reduction rate is greater than or equal to the threshold value as the final concatenated quantity.

11. The transmission device according to claim 9, further comprising:
a channel determination circuit which determines data size set for each of the plurality of channels and generates an enable signal based on the determination result, in which the channel determination circuit provides at least one of the packet generators related to at least one of the channels in which the data size is large with the enable signal for transmitting the normal packet in each communication cycle, and the channel determination circuit provides at least two of the packet generators related to at least two of the channels in which the data size is small with the enable signal for transmitting the concatenated packet in different communication cycles; and
a channel selector which receives the enable signal and selects the concatenated packet or the normal packet output from one of the plurality of packet generators in accordance with the enable signal.

12. The transmission device according to claim 9, wherein the concatenated quantity control circuit sorts and ranks the plurality of channels in descending order in accordance with data size set for each channel, sequentially calculates the data reduction rate from channels having larger data sizes, subtracts one from the rank of the channel in which the reduction rate first becomes greater than or equal to the threshold value, and subtracts the obtained value from the total number of channels to determine the final concatenated quantity.

* * * * *

UNITED STATES PATENT AND TRADEMARK OFFICE
CERTIFICATE OF CORRECTION

PATENT NO. : 8,422,404 B2
APPLICATION NO. : 12/385002
DATED : April 16, 2013
INVENTOR(S) : Nobuhiro Taki It is certified that error appears in the above-identified patent and that said Letters Patent is hereby corrected as shown below:

In the Claims

Column 17, Line 27, In Claim 7, after "wherein" delete "said a".

Signed and Sealed this
Seventeenth Day of September, 2013

Teresa Stanek Rea
*Deputy Director of the United States Patent and Trademark Office*